(12) United States Patent
Calkins et al.

(10) Patent No.: US 6,840,105 B2
(45) Date of Patent: Jan. 11, 2005

(54) METHOD AND APPARATUS FOR BALANCING A VEHICLE DRIVESHAFT

(75) Inventors: Thomas Ray Calkins, Santa Barbara, CA (US); Ohlan Silpachai, Ventura, CA (US); Robert J. Dial, Santa Barbara, CA (US); Kevin Gehris, Santa Barbara, CA (US); Michael G. Shinn, Santa Barbara, CA (US)

(73) Assignee: Vetronix Corporation, Santa Barbara, CA (US)

( * ) Notice: Subject to any disclaimer, the term of this patent is extended or adjusted under 35 U.S.C. 154(b) by 0 days.

(21) Appl. No.: 10/341,639

(22) Filed: Jan. 14, 2003

(65) Prior Publication Data

US 2003/0154785 A1 Aug. 21, 2003

Related U.S. Application Data

(60) Provisional application No. 60/348,669, filed on Jan. 14, 2002.

(51) Int. Cl.$^7$ ............................................. G01M 1/16
(52) U.S. Cl. ............................ 73/469; 73/460; 73/471
(58) Field of Search ..................... 73/462, 460, 464, 73/470, 469, 458, 573, 468, 471

(56) References Cited

U.S. PATENT DOCUMENTS

| | | | | |
|---|---|---|---|---|
| 4,887,989 A | * | 12/1989 | Kerecman | 464/180 |
| 5,046,361 A | * | 9/1991 | Sandstrom | 73/460 |
| 5,419,192 A | * | 5/1995 | Maxwell et al. | 73/462 |
| 5,431,049 A | | 7/1995 | Kopp | 73/457 |
| 5,767,403 A | | 6/1998 | Kopp et al. | 73/468 |
| 5,922,952 A | | 7/1999 | Moradi et al. | 73/462 |
| 6,523,407 B1 | * | 2/2003 | Breese | 73/457 |
| 6,655,208 B1 | * | 12/2003 | McClanahan | 73/462 |

OTHER PUBLICATIONS

Marriott et al., Driveshaft assembly that is balanced for rotation and method of manufacturing same, Mar. 13, 2003, US 2003/0050128A1.*

Rapp, Method and apparatus for balancing an article of rotation, Apr. 17, 2003, US 2003/0074151.*

Hagiwara, Vibration measuring method, balance correcting method, and information recording and/or reproducing apparatus, Apr. 25, 2002; US 2002/0046607.*

Calkins et al., Noise, vibration and harshness analyzer, May 8, 2003, US 2003/0088346.*

* cited by examiner

*Primary Examiner*—Hezron Williams
*Assistant Examiner*—Jacques M. Saint-Surin
(74) *Attorney, Agent, or Firm*—Koppel, Jacobs, Patrick & Heybl

(57) ABSTRACT

The present invention provides a method and apparatus for balancing vehicle driveshafts. One embodiment of a method according to the present invention comprises analyzing a driveshaft and determining a balancing vector to counter any imbalance in the driveshaft. A determination is then made of the appropriate location on the driveshaft for mounting a weight to counter said imbalance and the weight is mounted to the driveshaft. An apparatus for balancing a driveshaft according to the present invention comprises one or more primary balancing weights capable of being mounted to pinion flange holes in a vehicle driveshaft. One or more secondary balancing weights are also included, each of which is capable of being mounted to, or held by, one of the primary weights. The primary weights and secondary weights are mounted to the pinion flange to provide a weight to counter any imbalance in the driveshaft. Another apparatus for balancing a driveshaft according to the present invention, comprises a clamp that is capable of being mounted to a driveshaft. One or more balancing weights are included, each of which is capable of being mounted to the clamp. The weight of the clamp and the balancing weights combine to provide a weight to counter an imbalance in the driveshaft when mounted to the driveshaft.

17 Claims, 5 Drawing Sheets

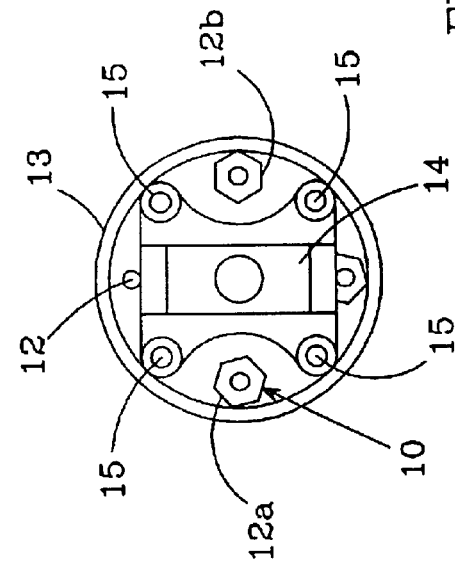
FIG. 2
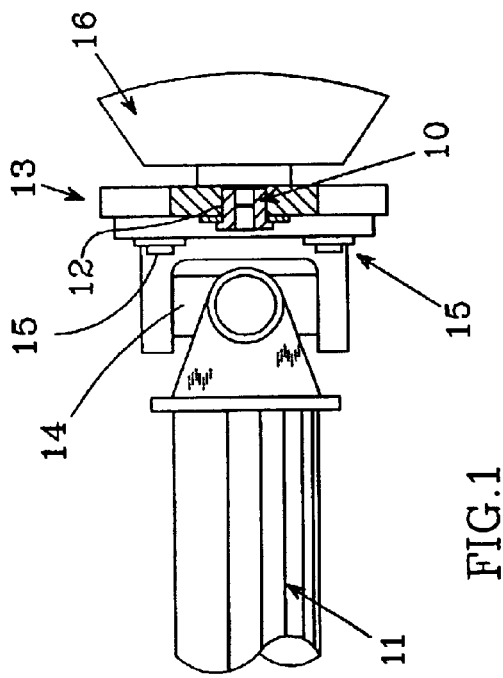
FIG. 1
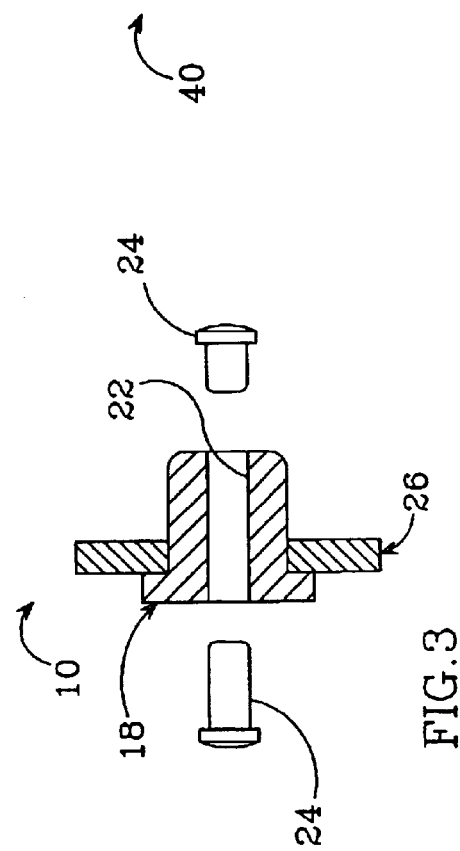
FIG. 3
| Quantity | Description | Weight (gm) |
|---|---|---|
| 4 | Bolts (18) | 5 |
| 2 | Washers (26) | 10 |
| 2 | Screw A (24) | 1 |
| 2 | Screw B (24) | 2 |
FIG. 4

| Weight (mg) | Pinon Flange Hole 1 (12a) | Pinon Flange Hole 3 (12b) |
|---|---|---|
| 1 | Bolt<br>Screw A | Bolt |
| 2 | Bolt<br>Screw B | Bolt |
| 3 | Bolt<br>Screw A<br>Screw B | Bolt |
| 4 | Bolt<br>Screw B<br>Screw B | Bolt |
| 5 | Bolt | |
| 6 | Bolt<br>Screw A | |
| 7 | Bolt<br>Screw B | |
| 8 | Bolt<br>Screw A<br>Screw B | |
| 9 | Bolt<br>Screw B<br>Screw B | |
| 10 | Bolt<br>Washer | Bolt |
| 11 | Bolt<br>Washer<br>Screw A | Bolt |
| 12 | Bolt<br>Washer<br>Screw B | Bolt |
| 13 | Bolt<br>Washer<br>Screw A<br>Screw B | Bolt |
| 14 | Bolt<br>Washer<br>Screw B<br>Screw B | Bolt |
| 15 | Bolt<br>Washer | |
| 16 | Bolt<br>Washer<br>Screw A | |
| 17 | Bolt<br>Washer<br>Screw B | |
| 18 | Bolt<br>Washer<br>Screw A<br>Screw B | |
| 19 | Bolt<br>Washer<br>Screw B<br>Screw B | |

FIG. 5

METHOD AND APPARATUS FOR BALANCING A VEHICLE DRIVESHAFT

This application claims the benefit and filing date of provisional application Ser. No. 60/348,669, which was filed on Jan. 14, 2002.

BACKGROUND OF THE INVENTION

1. Field of the Invention

The present invention relates to vehicle repair and more particularly to apparatuses and methods for balancing an unbalanced vehicle driveshaft.

2. Description of the Related Art

Noise, vibration and harshness conditions are a common cause for vehicle owners to bring their vehicles to dealerships or other repair facilities for service. These conditions are often difficult to diagnose and are one of the top "No Trouble Found" (NTF) anomalies in the service environment today. In many instances, after a NTF diagnosis, the vehicle is returned to the owner without properly addressing the problem. These can lead to customer dissatisfaction and increased service costs when a customer returns the vehicle for additional service.

One cause of the noise and vibration conditions is an unbalanced driveshaft, which is often difficult to diagnose. If a service technician discovers that this is the likely cause of the condition, the driveshaft can also be difficult to easily and quickly repair. Typically, after a technician has identified an unbalanced driveshaft, the driveshaft must be removed and sent to a different facility for balancing. The balancing process typically requires welding a known weight at a strategic location on the driveshaft to counter the imbalance. The driveshaft is then sent back to the technician so it can be re-installed on the vehicle. This process is expensive, time consuming and is not effective in all cases because the imbalance may be the result of components that are left on the vehicle.

As an alternative, the driveshaft can be balanced on the vehicle. Most procedures that are currently in use for on-vehicle balancing utilize hose clamps for attaching balancing weights to the driveshaft to counter the imbalance. Generally, two hose clamps are used and rotated relative to the driveshaft and relative to each other in order to obtain the desired net balance weight at the desired location on the driveshaft. This approach is inherently inaccurate and relies heavily on "trial and error" methods for determining where to position the driveshaft.

SUMMARY OF THE INVENTION

The present invention provides apparatuses and methods that allow vehicle service technicians to quickly and accurately balance automobile driveshafts without removing them from vehicles. One embodiment of a method for balancing a driveshaft according to the present invention comprises analyzing a driveshaft and determining a balancing vector to counter an imbalance in said driveshaft. A determination is then made of the appropriate location on said driveshaft for mounting a weight to counter the imbalance and the weight is mounted to the driveshaft.

An apparatus for balancing a driveshaft according to the present invention comprises one or more primary balancing weights capable of being mounted to holes in a pinion flange on a vehicle driveshaft. One or more secondary balancing weights are also included, each of which is capable of being mounted to, or held by, one of the primary weights. The primary weights and secondary weights are mounted to the pinion flange to provide a mass to counter any imbalance in the driveshaft.

Another apparatus for balancing a driveshaft according to the present invention, comprises a clamp that is capable of being mounted to a driveshaft. One or more balancing weights are included, each of which is capable of being mounted to the clamp. The weight of the clamp and the balancing weights combine to provide a weight to counter an imbalance in the driveshaft when mounted to the driveshaft.

The invention can be used by trial and error in attaching the weights to produce the desired counter to a driveshaft imbalance. Alternatively, a system for balancing a driveshaft according to the present invention comprises an analyzer for determining the location for mounting balancing weights to a driveshaft to counter a driveshaft imbalance. Balancing weights are included that are capable of being mounted to the driveshaft based on the finding of the analyzer to counter an imbalance in the driveshaft.

These and other further features and advantages of the invention will be apparent to those skilled in the art from the following detailed description, taken together with the accompanying drawings, in which:

BRIEF DESCRIPTION OF THE DRAWINGS

FIG. 1 is an elevation view of a driveshaft with a partial sectional view showing an apparatus according to the present invention used to counter a driveshaft imbalance;

FIG. 2 is a front view of a pinion flange of the driveshaft in FIG. 1;

FIG. 3 is a sectional view of the primary and secondary balancing weights according to the present invention;

FIG. 4 is a table showing one embodiment of the primary and secondary weights provided according to the invention to counter a driveshaft imbalance;

FIG. 5 is a table showing one embodiment of the different mounting combinations of primary and secondary weights according to the present invention;

DETAILED DESCRIPTION OF THE INVENTION

Figure 6:
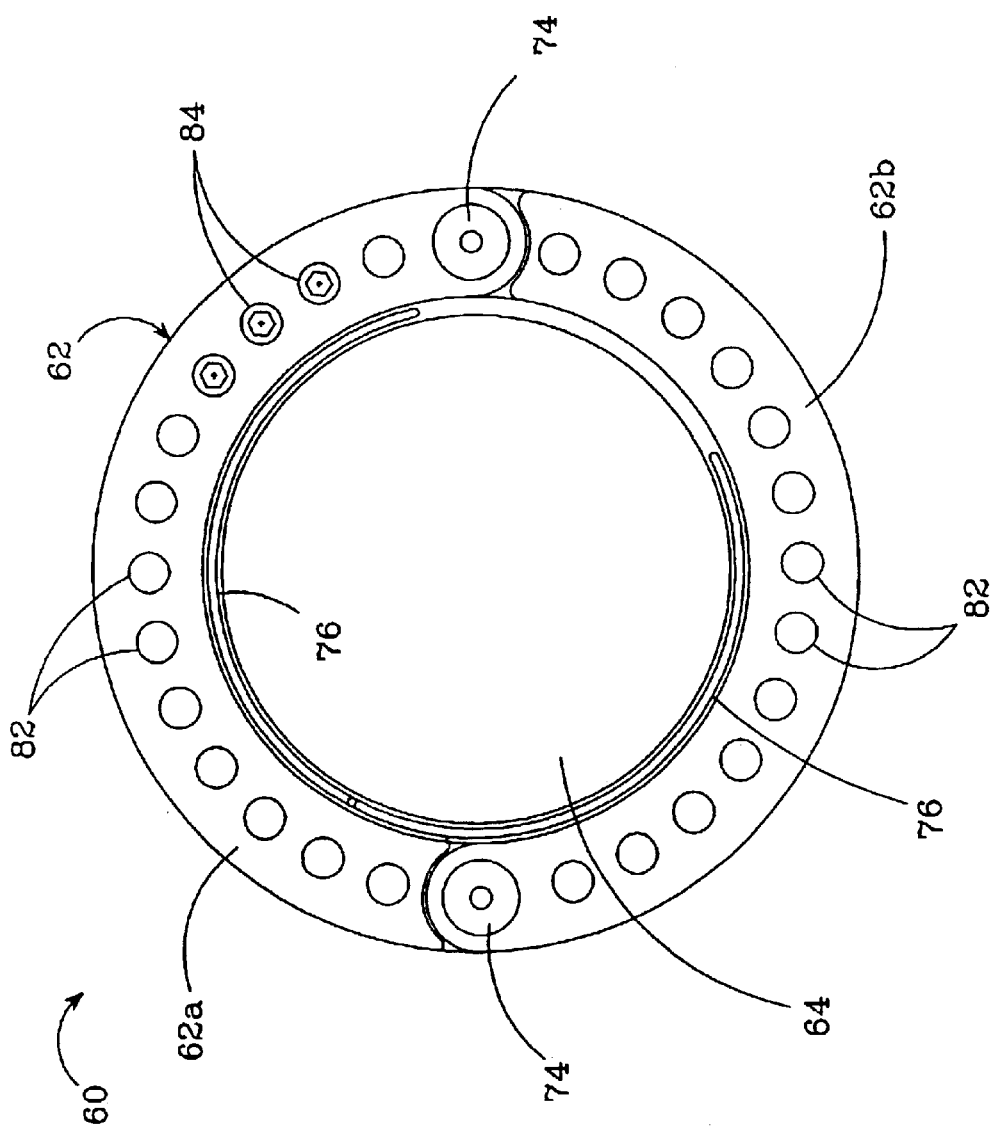
FIG. 6 is a front elevation view of one embodiment of a driveshaft clamp according to the present invention.

FIGS. 1–3 show one embodiment of a driveshaft balancing apparatus 10 according to the present invention, wherein balancing weight components are attached directly to the driveshaft 11 to counter a driveshaft imbalance. This embodiment is particularly adapted to attaching weights to the threaded holes 12 (typically M12×1.5 mm) on the pinion flange 13 between the driveshaft's universal joint 14 and the differential housing 16. The universal joint 14 is attached to the pinion flange 13 by flange mounting bolts 15 that are fed though holes in the universal joint 14 and then mounted to the pinion flange holes 12. A plurality of pinion flange holes 12 are left unused by the flange mounting bolts 15. The invention comprises primary weights that can be mounted in the unused pinion flange holes 12. Many different weights can be used, with suitable weights having threads to mate with the threads in the pinion holes 12. Other secondary necessary weights can also be included that are attached to, or held by, the primary weight.

As shown in FIG. 3, the preferred primary weights comprise bolts 18 and the preferred secondary weights comprise screws 24 and washers 26. Each bolt 18 is threaded on its outside surface to mate with the threads in the holes 12 and is mounted in a flange hole 12 by turning and tightening the bolt 18 into the hole 12. Each of the bolts 18 also has a bolt hole 20 down its longitudinal axis that has internal threads 22. Different types of screws 24 are included, each of which can be mounted in a bolt hole 20 by mating the threads from the screw 24 with the bolt's internal threads 22. Different types of screws 24 can be included that have different weights that allow for the addition of different weights to the bolt 18. Additional weight can also be added to each bolt 18 by including a washer 26 that can be held between the head of the bolt 18 and the surface of the pinion flange around the pinion flange hole 12.

To provide the desired counter balance to the driveshaft's imbalance, the appropriate combinations of bolts 18 are mounted in the pinion flange holes 12 with washers 26 and screws 24. FIG. 4 shows a table 40 with different numbers of bolts 18, washers 26, and screws 24 (referred to as Screw A and Screw B), and their respective weights, all of which could be provided as a kit to vehicle service technicians. Different combinations of the bolts 18, washers 26, and screws 24 shown can achieve a counterbalance weight in the range of one (1) to nineteen (19) grams at a particular location on the pinion flange 13.

FIG. 5 shows a table 50 with different combinations of weights from the bolts 18, washers 26 and screws 24 attached to opposing pinion flange holes 12a and 12c (shown in FIG. 2) to achieve the range of effective counterbalance weights at hole 12a. For example, to have a six (6) gram weight at hole 12a, a five (5) gram bolt 18 is mounted in hole 12a and a one (1) gram screw is mounted in the longitudinal bolt hole 20. To have an effective 10 gram weight at hole 12a, a five (5) gram bolt is mounted in hole 12a with a ten (10) gram washer. A counter weight five (5) gram bolt is mounted in the opposing hole 12c to counter the bolt in hole 12a, leaving an effective weight of ten (10) grams in hole 12a.

Many different kits with different components can be used in different ways in accordance with the present invention. The components of kits pursuant to the present invention should be either attachable to a vehicle driveshaft or attachable to each other to provide different balancing weights on the driveshaft. The kit components can be made of many different materials, such as different metals or alloys of metal.

In one embodiment of a method for balancing a driveshaft according to the invention, the bolts 18, washers 26, and screws 24, are mounted in the pinion flange holes 12 by trial and error to achieve the desired counterbalance. In an alternative method according to the invention, a vibration analyzer is used, which is arranged to analyze noise, vibration and harshness conditions in a vehicle, and to determine the causes of the conditions. If the analyzer determines that the driveshaft is out of balance, the analyzer can compute the balancing required to cancel out the imbalance. The analyzer determines a balancing vector, which is the weight and angle of a counterbalancing mass. The analyzer can then break down the balancing vector into orthogonal components corresponding to the axes of the pinion flange hole pattern. The analyzer then rounds these components to the closest weight that is available through the combination of kit components in FIG. 4, and can provide instructions to the technician regarding which components to install in which pinion flange holes 12. After the balancing weights are installed, a final verification test run is performed in order to verify that an acceptable driveshaft balance has been achieved. One suitable analyzer that can be used in accordance with the invention, is the MTS™ 4100 Noise, Vibration and Harshness Analyzer, provided by Vetronix Corporation (assignee herein).

Figure 7:
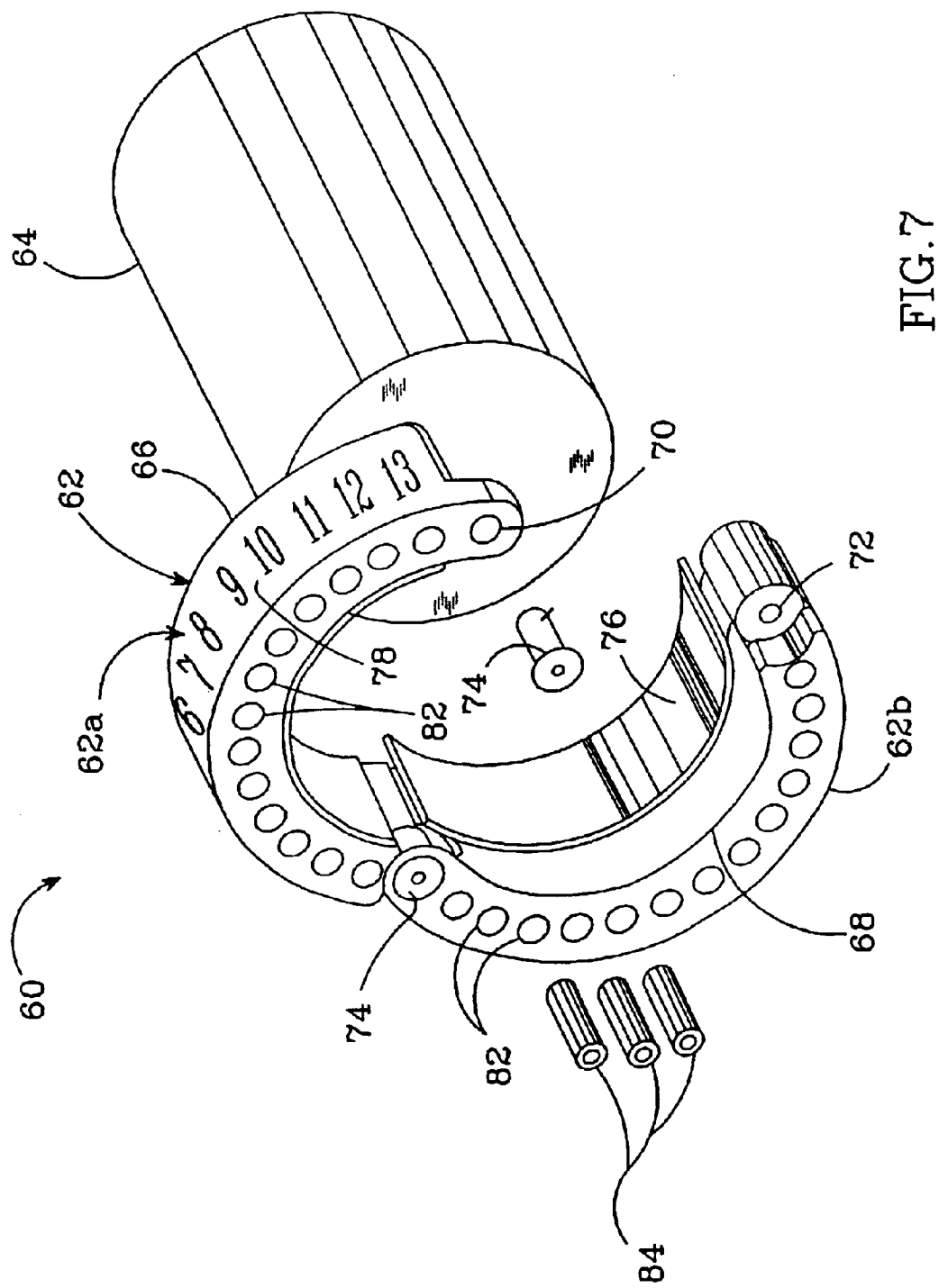
FIG. 7 is a perspective view of the clamp in FIG. 6 before being mounted on a driveshaft.
Figure 8:
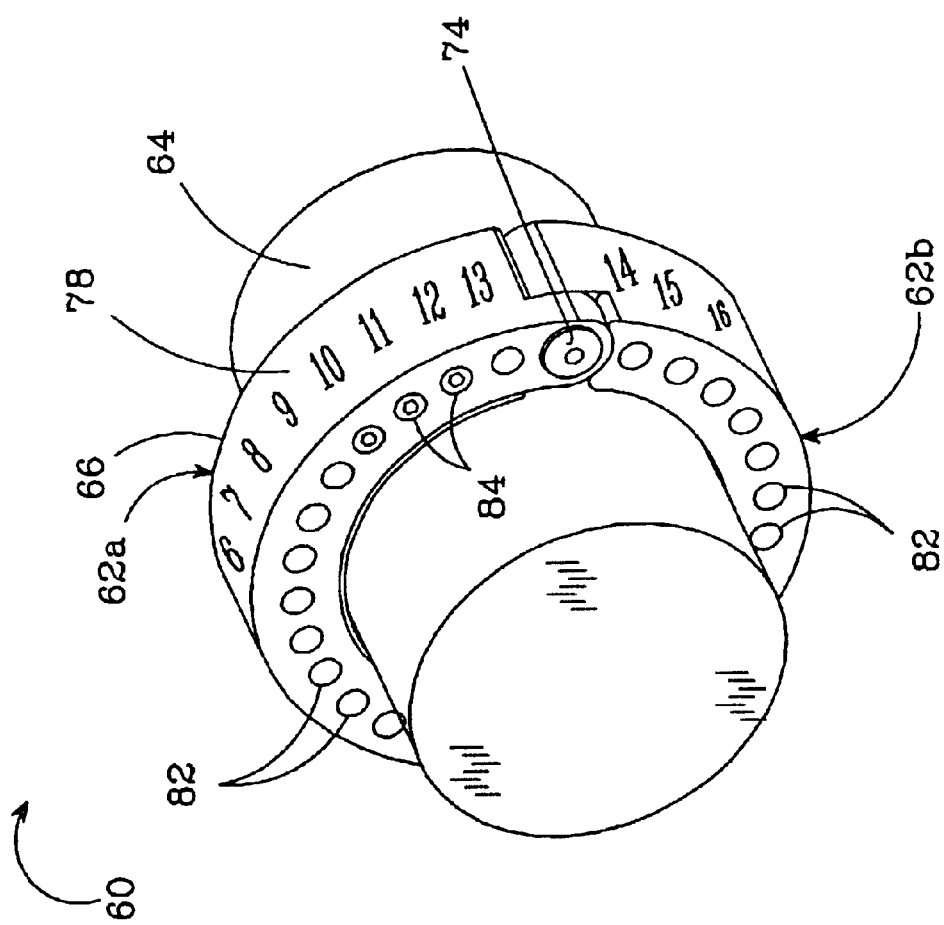
FIG. 8 is a perspective view of the clamp in FIG. 6 after it is mounted on a driveshaft.

FIGS. 6–8 show another embodiment of a driveshaft balancing apparatus 60 according to the present invention that can be mounted directly on a driveshaft. It can be used alone on driveshafts that do not have pinion flange holes, or it can be used with combination with the balancing apparatus 10 shown in FIGS. 1 to 3 for those driveshafts having pinion flange holes.

The apparatus 60 generally comprises a ring clamp 62 that is mounted directly to a driveshaft 64. The clamp 62 can be made of many different rigid and rugged materials, with a suitable material being a metal such as aluminum. It can also be manufactured using many known methods, with a preferred method being extrusion. The clamp 62 can be mounted different locations on a driveshaft 64 that have sufficient clearance between the driveshaft 64 and the surround vehicle components. The clamp 62 can have many different dimensions, with a typical height of the installed ring above the driveshaft being approximately one half (½) an inch. Clearance around the driveshaft of slightly more than the height of the ring is necessary. A suitable location for mounting the clamp 62 is at the end of the driveshaft near the rear of the vehicle.

The clamp 62 comprises first and second half circle sections 62a, 62b that are separate prior to installation on a driveshaft. Each section 62a, 62b has a depth such that each has an outside surface 66 and an inside surface 68, with a typical depth being approximately one (1) inch. Each section 62a, 62b has an upper connection hole 70 and a lower connection hole 72. During installation, the first section 62a is held on the driveshaft with its inner surface against the driveshaft. The second section 62b is then held against the opposite side of the driveshaft and mates with the first section 62a. The upper connection hole 70 from each of the sections 62a, 62b is aligned with the lower connection hole 72 of the other section. The sections 62a, 62b form a ring around the driveshaft that is sized for the particular driveshaft being balanced.

The sections 62a, 62b can be mounted together on the driveshaft using many different methods such an bolting, bonding, gluing or welding, with a preferred method being riveting. A suitable rivet is a blind rivet (pop rivet) 74, which is known in the industry and is only described briefly. Blind rivets include a longitudinal hole and a mandrel positioned within the hole. The rivet 74 is placed in and through each of the holes created by the aligned upper and lower connection 70, 72 holes. A riveting tool is then used to pull the mandrel while holding the rivet 74 in the hole. The action of pulling on the mandrel expands the portion of the rivet 74 extending from the back side of the hole to form a backside head.

The clamp 62 also comprises one or more elastomer gaskets 76, each of which is sandwiched between the inside surface 68 of clamp 62 and the driveshaft. The gaskets 76 provide a friction between the installed clamp 62 and the driveshaft 64 which holds the clamp 62 on the driveshaft and prevents it from moving from its fixed position on the driveshaft 64 when the driveshaft 64 is spinning. Different numbers of gaskets 76 can be used and depending on the diameter of the driveshaft 64, the gaskets 76 can have different thicknesses. Different materials can be used alone or in conjunction with the gaskets 76 to hold the clamp, such as glues or epoxies. Other holding methods can be used such as bolting or welding.

The outside surface 68 of each section 62a, 62b has a label 78 affixed to it that has a series of numbers that are aligned with tapped holes 82 in the clamp 62, such that each of the tapped holes 82 has its own number. The clamp can have many different numbers of holes, with the preferred range being twenty (20) to thirty (30) holes and the clamp 62 having twenty-six (26) holes. Each of the holes 82 is arranged to receive and hold a counter balancing weight for balancing the driveshaft 64. Different types of weights can be attached to the clamp 62, with the preferred weights being set screws 84. Each of the set screws 84 is threaded on its outside surface to mate with threads on the inside surface of the holes 82, such that each set screw 84 can be turned and tightened into one of the holes 82. The set screws 84 can be different types of screws with different weights. In the apparatus 60, the set screws 84 are the same type and weight Like above, one method of balancing a driveshaft according to the invention is by mounting the set screws 84 in the holes 82 by trial and error to achieve the desired counterbalance. In an alternative method according to the invention, a vibration analyzer, as described above, can be used that computes the balancing required to cancel out the imbalance measured on the driveshaft. The analyzer determines a balancing vector, and can provide the service technician with instructions regarding the particular holes 82 to insert a set screw 84. After these balancing weights are installed, a final verification test run is performed in order to verify that an acceptable driveshaft balance has been achieved.

Although the present invention has been described in considerable detail with reference to certain preferred configurations thereof, other versions are possible. For example, different balancing components can be used that can be positioned in different ways on the driveshaft. Also different types of vibration analyzers can be used. The clamp have a different shape and can have a different number of sections arranged in different ways. Therefore, the spirit and scope of the present invention should not be limited to the preferred versions of the invention described above.

We claim:

1. A method for balancing a driveshaft, comprising:
    analyzing said driveshaft;
    determining if an imbalance exists in said driveshaft;
    determining the appropriate weight to counter said imbalance and the location on said driveshaft to mount said weight to counter said imbalance;
    mounting a weight holding device to said driveshaft; and
    mounting weight to said weight holding device to counter said imbalance.

2. The method of claim 1, wherein said determination if an imbalance exists comprises generating a balancing vector having a weight and angle of a mass.

3. The method of claim 1, wherein said weight holding device comprises a clamp ring mounted around said driveshaft, said weight mounted to said clamp ring.

4. The method of claim 3, wherein said weight comprises a plurality of weights mounted to said clamp ring.

5. The method of claim 1, further comprising re-analyzing said driveshaft after said weight has been mounted to said weight holding device to confirm that said driveshaft is balanced.

6. The method of claim 1, wherein said driveshaft is analyzed using a noise vibration and harshness analyzer.

7. An apparatus for balancing a driveshaft, comprising:
    a clamp mounted to a driveshaft; and
    one or more balancing weights, each of which being mounted to said clamp, the weight of said clamp and said one or more balancing weights combining to provide a weight to counter an imbalance in said driveshaft when mounted to said driveshaft.

8. The apparatus of claim 7, wherein said clamp comprises a ring around said driveshaft.

9. The apparatus of claim 8, wherein said clamp further comprises a plurality of tapped holes and said one or more balancing weights comprises one or more set screws, each of said set screws being mounted to one of said tapped holes.

10. The apparatus of claim 8, wherein said clamp ring comprises two half circle sections mounted together around said driveshaft.

11. The apparatus of claim 7, further comprising a gasket to keep said clamp from moving in relation to said driveshaft when said driveshaft spins.

12. The apparatus of claim 7, further comprising a hole number label having a series of numbers each of which is adjacent to and identifies one of said tapped holes.

13. The apparatus of claim 7, further comprising an analyzer to determine the appropriate location for mounting said balancing weights to said clamp to counter an imbalance in said driveshaft.

14. The apparatus of claim 13, wherein said analyzer provides instructions on the appropriate location for mounting said clamp to counter an imbalance in said driveshaft.

15. A system for balancing a driveshaft, comprising:
    an analyzer for determining the location for mounting weigh to said driveshaft to counter an imbalance in said driveshaft;
    a weight holding device mounted to said driveshaft; and
    balancing weights mounted to said weight holding device based on the determination of said analyzer to counter an imbalance in said driveshaft.

16. The system of claim 15, wherein said weight holding device comprises a clamp and said balancing weights comprise one or more set screws, said clamp being mounted to said driveshaft and said one or more set screws being mounted to said clamp, the weight of said clamp and said one or more set screws combining to provide a balancing weight to counter an imbalance in said driveshaft when mounted to said driveshaft.

17. A method for the balancing of a driveshaft, comprising:
    analyzing said driveshaft;
    determining if an imbalance exists in said driveshaft;
    mounting a weight holding device to said driveshaft;
    determining the appropriate weight to counter said imbalance and the location on said weight holding device to mount said weight to counter said imbalance; and
    mounting weight to said weight holding device to counter said imbalance.

* * * * *

UNITED STATES PATENT AND TRADEMARK OFFICE
CERTIFICATE OF CORRECTION

PATENT NO. : 6,840,105 B2
DATED : January 11, 2005
INVENTOR(S) : Calkins et al.

It is certified that error appears in the above-identified patent and that said Letters Patent is hereby corrected as shown below:

Column 6,
Line 36, delete "weigh" and insert -- weight --.

Signed and Sealed this

Twenty-fifth Day of October, 2005

JON W. DUDAS
*Director of the United States Patent and Trademark Office*